Jan. 19, 1954

W. B. BELL 2,666,342

POWER TRANSMISSION MECHANISM

Filed Dec. 12, 1947

INVENTOR.
WILLIAM B. BELL
BY

ATTORNEY

Jan. 19, 1954         W. B. BELL         2,666,342
POWER TRANSMISSION MECHANISM
Filed Dec. 12, 1947         3 Sheets-Sheet 2
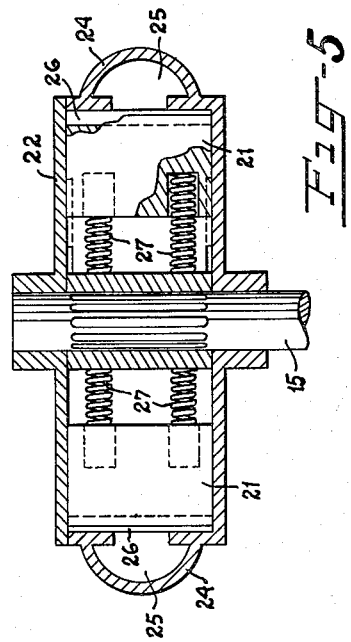
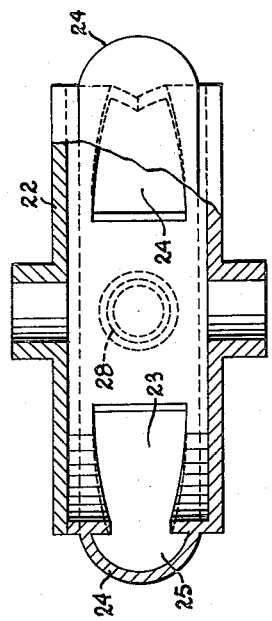
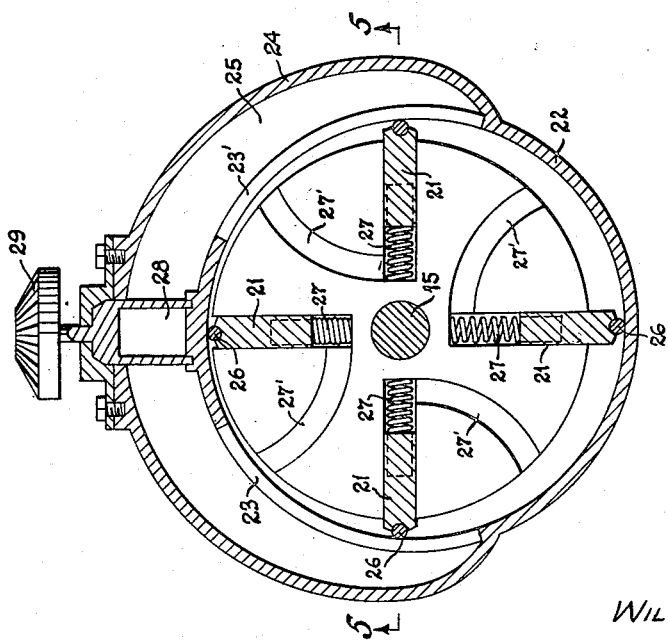
INVENTOR.
WILLIAM B. BELL
BY
ATTORNEY

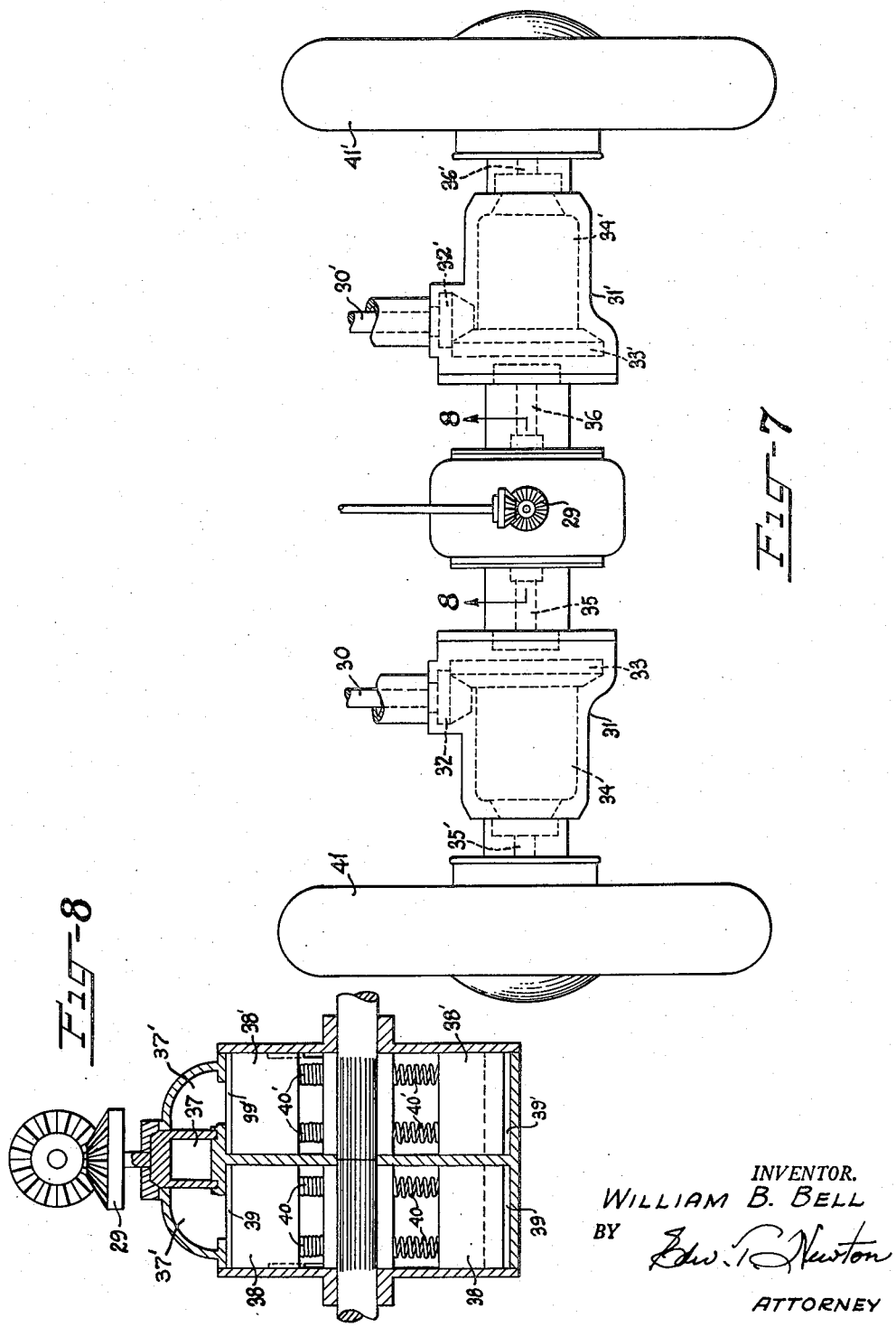

Patented Jan. 19, 1954

2,666,342

UNITED STATES PATENT OFFICE 2,666,342

POWER TRANSMISSION MECHANISM

William B. Bell, Atlanta, Ga., assignor of one-third to Edward Taylor Newton and George M. Hopkins Application December 12, 1947, Serial No. 791,347

4 Claims. (Cl. 74—710)

This invention relates to power transmission mechanism, and more particularly to mechanism comprising differential gearing and fluid control means therefor for transmitting power at variable speeds.

An object of my invention is to provide apparatus for controlling the speed of a driven shaft.

Another object is to provide apparatus for simultaneously controlling the speed of a plurality of driven shafts.

Another object of my invention is to control the speed of a shaft, driven through differential gearing, by regulating the speed of the opposite shaft driven by the same differential gearing.

Another object of my invention is to provide fluid control means for regulating the speed of a rotating shaft.

Another object of my invention is to provide fluid control means, which can be operated in either direction of rotation, for controlling the rotating speed of a driven shaft.

Another object of my invention is to provide means which will act as a fluid differential between differential gear means.

Another object of my invention is to provide means to replace the customary clutch, transmission and differential in a motor vehicle.

Another object of my invention is to provide fluid controlled, power transmission mechanism suitable for use in motor vehicles.

Another object of my invention is to provide fluid controlled, power transmission mechanism which can be used in motor vehicles to throw torque from the wheels into the decelerated motor to brake the vehicle.

Another object of my invention is to provide fluid controlled, power transmission mechanism affording a wide range of continuous speed variations in either forward or reverse direction of rotation.

All of the foregoing and still further objects and advantages of my invention will be apparent from the following description taken in connection with the accompanying drawing in which like characters of reference designate corresponding parts in the several views, and wherein:

Figure 4 is an axial cross-sectional view of the fluid control means.

Figure 5 is a cross-sectional view taken along the line 5—5 in Figure 4.

Figure 6 is a cross-sectional view similar to Figure 5 with rotating parts omitted.

Figure 7 is a fragmentary plan view, with parts in cross-section, showing the power transmission mechanism applied to a motor vehicle.

Figure 8 is a cross-sectional view taken along the line 8—8 in Figure 7.

Figure 1:
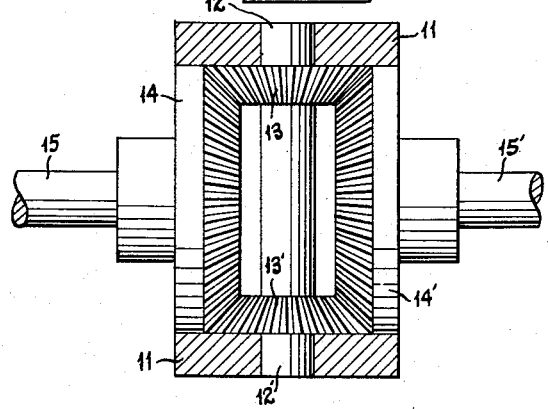
Figure 1 is a cross-sectional view of differential gear mechanism.

Referring to Fig. 1, the driving housing 11 carries stub shafts 12, 12' on which are mounted spider gears 13, 13' in constant mesh with side gears 14, 14' mounted on the driven shafts 15, 15', respectively, which are journaled for rotation in the sides of the housing 11. As the housing 11 rotates it causes driven shafts 15, 15' to rotate in the same direction and at the same speed by means of the spider gears 13, 13' and side gears 14, 14' which rotate as a unit when the resistance is equal on the two driven shafts 15, 15'.

If the rotary motion of shaft 15 is retarded, there will be a corresponding increase in the rotating speed of shaft 15' due to the operation of the spider gears 13, 13' and side gears 14, 14'. By reducing the speed of revolution of side gear 14, the idle spider gears 13, 13' begin rotating around gear 14 and impart to gear 14' a corresponding rotation which is in addition to the rotary speed of the driving housing 11. Any change in the rotating speed of shaft 15 is immediately transferred to shaft 15' through the differential gearing. If either of the driven shafts 15 or 15' is controlled by increasing or decreasing its rotating speed, the uncontrolled driven shaft will increase or decrease its rotating speed accordingly; and if the driven shaft 15, for example, is stopped while the driving housing 11 is rotating, the driven shaft 15' will receive all of the rotary motion of the driving housing 11 plus the rotary motion caused by the gears 13, 13' rotating around the stationary gear 14.

Figure 3:
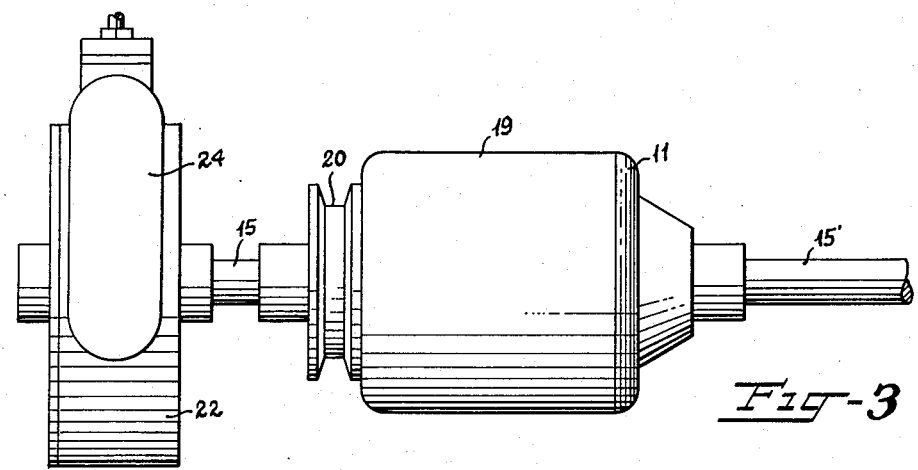
Figure 3 shows apparatus similar to Figure 2 but arranged to be driven by belt means.
Figure 2:
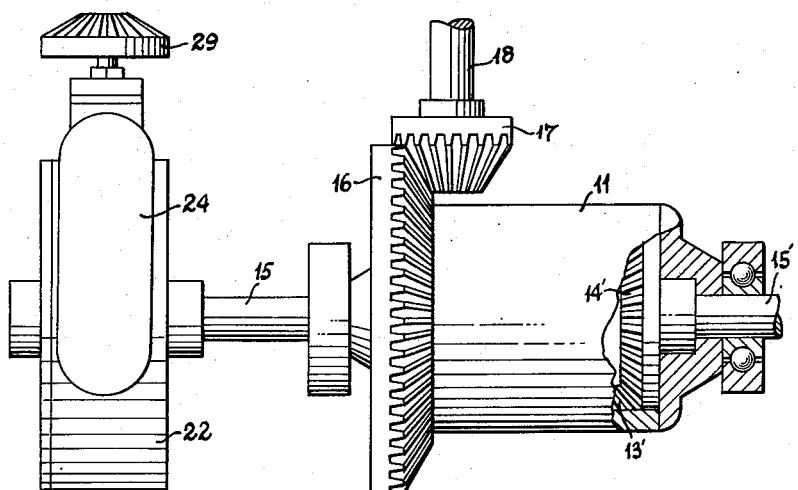
Figure 2 shows differential gear means receiving power from a drive shaft and having fluid control means connected to one of the driven shafts for controlling the rotating speed of the other driven shaft.

In Figure 2 I have shown mechanism for controlling the speed of the driven shaft 15 so as to transmit power at variable speed through the shaft 15'. In this view, the driving housing 11 is shown with a ring gear 16 fixed thereto for receiving power from pinion gear 17 mounted on drive shaft 18. As shown in Figure 3, the housing 11 may receive power from a flat belt (not shown) applied to the cylindrical surface 19 or from a V-belt (not shown) turning in the pulley-like groove 20 formed on the housing. It will of course be obvious to those skilled in the art that various other means can be employed for supplying power to the housing 11 without departing from the scope of my invention.

The controlling mechanism, shown in detail in Figures 4, 5 and 6, comprises a plurality of vanes 21 mounted for rotation on an extension of shaft 15 which is eccentrically mounted within a housing 22. The housing 22 is provided with inlet-outlet ports 23, 23' each of which acts either as an inlet port or as an outlet port depending upon the direction of rotation of the vanes 21, as will be more fully described hereinafter. An outer housing 24 partly surrounds the housing 22 and forms therewith a passage 25 for oil or other suitable fluid therein.

The vanes 21 are each provided with a roller bearing shoe 26 which is pressed against the inside of the housing 22 by means of springs 27. The fluid within the control mechanism is picked up by the rotating vanes 21 through a port 23 on one side of the housing 22 and carried around to the other side of the housing 22 and discharged through the opposite port 23' into the passage 25 through which it flows and thence back to port 23 where it is again picked up.

The springs 27 are assisted in their action by fluid under pressure which flows from the passage 25 through channels 27' which lead behind the vanes 21 to keep the shoes 26 pressed firmly against the housing at the proper time. This arrangement also makes the controlling mechanism more flexible in its action as it will release sudden and high pressures by allowing a small quantity of fluid to pass around the vanes.

The passage 25 is provided with a valve 28 which controls the flow of fluid through the passage 25 and hence through the control mechanism. The valve 28 is operated externally of the control mechanism by means of gearing 29 or any other suitable means.

With the valve 28 fully open, the passage of the fluid through the control mechanism would be unrestricted and the rotating vanes would be free to circulate the fluid around through the control mechanism which would then offer but the very slightest resistance to the freely rotating shaft 15. Under such conditions the rotary motion imparted to the driving housing would be taken up by the freely rotating shaft 15, and the shaft 15' would cease rotating under any practical load. By slightly closing valve 28 the flow of fluid within the control mechanism is retarded which results in a building up of pressure against the rotating vanes 21 with a resulting decrease in the rotary speed of shaft 15 and a corresponding increase in the speed of shaft 15'.

When the control valve 28 has been adjusted to allow shafts 15 and 15' to rotate at the same speed, which will be equal to the speed of the driving housing 11, then any closing of the control valve 28 would retard the speed of shaft 15 and decreases the speed of shaft 15'. This would result in an overdrive in the shaft 15' due to the fact that shaft 15' would be revolving at a speed greater than the speed of the driving housing 11. With still further closing of the control valve 28 the overdrive speed of the shaft 15' increases until the valve 28 is completely closed and shaft 15 stops rotating. It is thus apparent that a wide speed range is obtainable through the simple operation of the control valve 28.

The foregoing has been in reference to single units as shown in Figures 2 and 3. Single units may be applied to lathes, pumps, motorcycles, motor boats, motor scooters and other tool or machines requiring for their operation a single driven shaft. A double unit arrangement may be applied to automobiles, trucks, tractors and any machinery or apparatus requiring or adapting two driven shafts for their operation.

In Figure 7 I show an arrangement in which my power transmission mechanism is adapted for use on an automobile, for example, in which the motive power means may be located either forward of or to the rear of the driving axle. Two drive shafts 30, 30' are employed to supply power to two conventional differentials 31, 31', similar to the differential gearing shown in Figure 2, and pinion gears 32, 32' mounted on drive shafts 30, 30', respectively, mesh with ring gears 33, 33' respectively, fastened to driving housing 34, 34', respectively. The driven shafts 35, 35' and 36, 36' are associated with the differentials 31, 31' respectively, as is well understood and as explained above in connection with the single unit. The driven shafts 35 and 36 are each connected to the rotatable vanes of a control unit similar to that shown in Figures 2 to 6 except that a single control valve 37 between partition 37' is employed to control the flow of fluid impelled by both sets of rotatable vanes 38, 38'. The shoes 39, 39' are pressed by springs 40, 40' and operate identically like those in the single unit described previously.

When the vehicle is operating on a straightaway, with the valve 37 set at a specific open position, the vanes 38, 39' circulate approximately the same amount of fluid through the valve 37, the speed of shafts 35, 36 are the same and the shafts 35', 36' will receive the same torque and rotate in the same direction at the same speed. Any change in the setting of valve 37 will result in a change in the speed of the driven shafts 35', 36' as explained in connection with the operation of the single unit.

The control unit shown in Figures 7 and 8 in its operation also functions as a fluid differential in between the two differential gear mechanisms. For example, assuming that the vehicle is traveling around a left-hand curve, the wheel 41' must travel somewhat faster than wheel 41, resulting in the increased speed of axle shaft 36' and a corresponding decrease in the speed of shaft 36 and vanes 38' which would then circulate somewhat less fluid. On the other hand, since wheel 41 is traveling relatively slower than wheel 41', shaft 35' would rotate slower which would thereby increase the speed of shaft 35, thus enabling vanes 38 to pump more fluid. It is apparent therefore that substantially the same volume of fluid would be pumped from the common high pressure side of partition 37' through valve 37 to the common low pressure side thereof; however, vanes 38 would be pumping a proportionately larger amount of fluid while vanes 38' would be pumping a proportionately smaller amount of fluid. It is obvious therefore that even though valve 37 merely controls the flow or surge of fluid from one side to the other side of housing 22, it also very effectively serves as a fluid differential.

Also, by means of my mechanism, the inertia of the decelerated motor (not shown) of the vehicle may be used in varying degree to brake or retard the speed of the vehicle. Assuming the vehicle to be traveling down grade at decelerated throttle at high speed and with the control valve 37 fully open, then there would be substantially no braking power from the motor, due to the fact that wheels 41, 41' have in this situation become the motive power where 30 and 30' are comparatively non-operating and the torque from the wheels is transferred through 35' to 35 and 36' to 36 which are now operating at high speed in reverse direction together with the corresponding connected vanes 38, 38'. In order to throw some of the torque created by the momentum of the vehicle against the decelerated motor for braking purposes, the valve 37 is closed slightly which results in the slowing down of vanes 38, 38' which will slow down shafts 35, 36 and divert part of the torque through the drive shafts 30, 30' to the motor (not shown). Obviously, the more the valve 37 is closed the larger the amount of torque thrown against the motor will be. The reversed rotation of the vanes 38, 38', as above described, with the corresponding reversed flow of liquid or other fluid through the control mechanism does not in any way affect the operation or efficiency of the control mechanism, as such a situation has been taken into consideration in designing the control unit to operate in both rotative directions.

The arrangement shown in Figure 7 carries out all the functions of the conventional clutch, differential and transmission, with the exception of a reversing mechanism. A reversing unit such as shown in U. S. Patent No. 2,244,657 could be installed anywhere along the two drive shafts 30, 30'. In other words, the clutch, transmission and differential may be eliminated and my power transmission mechanism substituted with no loss of operating efficiency. Moreover, some of the advantages of the mechanism, as disclosed in Figure 7, over the conventional units of the present day automobile, for example, are: power is applied to both of the driven wheels 41, 41' even though one of them may be without traction; smooth, no-step speed changes are possible from zero to the limit of the machine; an overdrive is had up to approximately double speed; the same speed controls are available in both forward and reverse direction of operation; and an increase or decrease in the braking power of the motor is had through the simple manipulation of the control valve.

I claim:

1. Power transmission mechanism comprising a plurality of driven shafts, fluid control means connected to said shafts for regulating the speed thereof, a plurality of sets of differential gears, a plurality of other shafts each connected respectively to a set of said differential gears for power take-off, and means for driving said differential gears, said fluid control means including a housing provided with a plurality of chambers, a plurality of independently rotatable sets of vanes, a set of said vanes being eccentrically mounted for rotation within each chamber, each of said driven shafts being connected respectively to a set of said vanes, an outer housing connected to said first named housing and forming therewith a passage for the flow of fluid therethrough, said passage communicating with each of said chambers by means of substantially triangular slots in the wall of said first named housing, fluid within said housings and said passage to be circulated by said vanes, and means for controlling the flow of fluid through said passage.

2. Power transmission mechanism comprising a plurality of driven shafts, fluid control means connected to said shafts for regulating the speed thereof, a plurality of sets of differential gears, a plurality of other shafts each connected respectively to a set of said differential gears for power take-off, and means for driving said differential gears, said fluid control means including a housing provided with a plurality of chambers, a plurality of independently rotatable sets of vanes, a set of said vanes being eccentrically mounted for rotation within each chamber, each of said driven shafts being connected respectively to a set of said vanes, an outer housing connected to said first named housing and forming therewith a passage for the flow of fluid therethrough, said passage communicating with each of said chambers by means of substantially triangular slots in the wall of said first named housing, fluid within said housings and said passage to be circulated by said vanes, said slots being constructed so that fluid entering said passage first enters through the narrow apex portion of a slot and fluid leaving said passage first leaves through the broad base portion of a slot, and means for controlling the flow of fluid through said passage.

3. Power transmission mechanism comprising a plurality of driven shafts, fluid control means connected to said shafts for regulating the speed thereof, a plurality of sets of differential gears, a plurality of other shafts each connected respectively to a set of said differential gears for power take-off, and means for driving said differential gears, said fluid control means including a housing provided with a plurality of chambers, a plurality of independently rotatable sets of vanes, a set of said vanes being eccentrically mounted for rotation within each chamber and provided with roller bearing shoes, each of said driven shafts being connected respectively to a set of said vanes, an outer housing connected to said first named housing and forming therewith a passage for the flow of fluid therethrough, said passage communicating with each of said chambers by means of substantially triangular slots in the wall of said first named housing, fluid within said housings and said passage to be circulated by said vanes, said slots being constructed so that fluid entering said passage first enters through the narrow apex portion of a slot and fluid leaving said passage first leaves through the broad base portion of a slot, and means for controlling the flow of fluid through said passage.

4. Power transmission mechanism comprising a plurality of driven shafts, fluid control means connected to said shafts for regulating the speed thereof, a plurality of sets of differential gears, a plurality of other shafts each connected respectively to a set of said differential gears for power take-off, and means for driving said differential gears, said fluid control means including a housing provided with a plurality of chambers, a plurality of independently rotatable sets of vanes, a set of said vanes being eccentrically mounted for rotation within each chamber and provided with roller bearing shoes, springs pressing said shoes into contact with said housing, each of said driven shafts being connected respectively to a set of said vanes, an outer housing connected to said first named housing and forming therewith a passage for the flow of fluid therethrough, said passage communicating with each of said chambers by means of substantially triangular slots in the wall of said first named housing, fluid within said housings and said passage to be circulated by said vanes, said slots being constructed so that fluid entering said passage first enters through the narrow apex portion of a slot and fluid leaving said passage first leaves through the broad case portion of a slot, means for controlling the flow of fluid through said passage, and means communicating with said springs and said passage so that fluid pressure in said passage assists said springs in pressing said shoes into contact with said first named housing.

WILLIAM B. BELL.

References Cited in the file of this patent

UNITED STATES PATENTS

| Number | Name | Date |
|---|---|---|
| 168,955 | Annin | Oct. 19, 1875 |
| 1,356,718 | Holt | Oct. 26, 1920 |
| 1,501,444 | English | July 15, 1924 |
| 1,548,460 | Harrigan | Aug. 4, 1925 |
| 1,584,223 | Horspoll | May 11, 1926 |
| 1,617,366 | Beard | Feb. 15, 1927 |
| 1,747,497 | Weylandt | Feb. 18, 1930 |
| 1,800,062 | Fordyce | Apr. 7, 1931 |
| 2,186,108 | Holloway | Jan. 9, 1940 |
| 2,248,942 | Black | July 15, 1941 |
| 2,300,424 | Jones | Nov. 3, 1942 |
| 2,309,875 | Thompson | Feb. 2, 1943 |
| 2,377,400 | Campbell | June 5, 1945 |

FOREIGN PATENTS

| Number | Country | Date |
|---|---|---|
| 445,218 | France | Nov. 6, 1912 |